United States Patent
Yang et al.

(10) Patent No.: US 10,402,619 B2
(45) Date of Patent: Sep. 3, 2019

(54) METHOD AND APPARATUS FOR DETECTING PRESSURE

(71) Applicant: Beijing Xiaomi Mobile Software Co., Ltd., Beijing (CN)

(72) Inventors: Kun Yang, Beijing (CN); Zhongsheng Jiang, Beijing (CN); Chuanshun Ji, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 15/434,385

(22) Filed: Feb. 16, 2017

(65) Prior Publication Data
US 2017/0235994 A1    Aug. 17, 2017

(30) Foreign Application Priority Data
Feb. 17, 2016 (CN) ............ 2016 1 0088291

(51) Int. Cl.
*G06K 9/00* (2006.01)
*G06K 9/36* (2006.01)
(Continued)

(52) U.S. Cl.
CPC ....... *G06K 9/0002* (2013.01); *G06K 9/00013* (2013.01); *G06K 9/00073* (2013.01); *G06K 9/036* (2013.01)

(58) Field of Classification Search
USPC .......... 382/124, 121, 284, 312; 348/77; 715/700
See application file for complete search history.

(56) References Cited

U.S. PATENT DOCUMENTS 5,982,914 A * 11/1999 Lee ............... G06K 9/00073
382/124
6,408,087 B1 * 6/2002 Kramer .......... G06F 3/03547
345/156
(Continued)

FOREIGN PATENT DOCUMENTS

CA    2430317 A1    11/2004
CN    1125007 A     6/1996
(Continued)

OTHER PUBLICATIONS

Extended European Search Report issued in European Patent Application No. 17155452.0, mailed from the European Patent Office, dated Jun. 28, 2017.
(Continued)

*Primary Examiner* — Kathleen Y Dulaney
(74) *Attorney, Agent, or Firm* — Finnegan, Henderson, Farabow, Garrett & Dunner LLP (57) ABSTRACT

The present disclosure relates to a method and an apparatus for detecting pressure. The method includes: acquiring, via a fingerprint recognition sensor, a plurality of successive fingerprint images; recognizing sweat pores in the plurality of successive fingerprint images; determining a feature of the recognized sweat pores in the plurality of successive fingerprint images; and determining a changing trend of pressure applied on the fingerprint recognition sensor over time based on a changing trend of the feature of the recognized sweat pores across the plurality of successive fingerprint images.

7 Claims, 6 Drawing Sheets

(51) Int. Cl.
*G06K 9/20* (2006.01)
*H04N 7/18* (2006.01)
*G06F 7/00* (2006.01)
*G06K 9/03* (2006.01)

(56) References Cited

U.S. PATENT DOCUMENTS

| | | | |
|---|---|---|---|
| 7,077,015 B2 | 7/2006 | Hayward et al. | |
| 7,280,679 B2* | 10/2007 | Russo | G06F 3/0414 340/5.53 |
| 7,474,772 B2* | 1/2009 | Russo | G06F 3/033 345/157 |
| 7,587,072 B2* | 9/2009 | Russo | G06F 3/03547 382/124 |
| 8,379,943 B2 | 2/2013 | Chiu | |
| 8,648,816 B2* | 2/2014 | Homma | G06F 3/0414 178/18.05 |
| 9,104,898 B2* | 8/2015 | Case | G06K 9/00013 |
| 2001/0005221 A1 | 6/2001 | Huang | |
| 2003/0021451 A1* | 1/2003 | Lee | G06K 9/00026 382/124 |
| 2004/0114784 A1* | 6/2004 | Fujii | G06K 9/00026 382/124 |
| 2004/0125994 A1* | 7/2004 | Engels | G06K 9/00026 382/124 |
| 2004/0237669 A1 | 12/2004 | Hayward et al. | |
| 2005/0100200 A1* | 5/2005 | Abiko | G06K 9/00026 382/124 |
| 2006/0078174 A1* | 4/2006 | Russo | G06F 3/0414 382/121 |
| 2008/0166028 A1* | 7/2008 | Turek | G06K 9/0002 382/124 |
| 2008/0317292 A1* | 12/2008 | Baker | G06K 9/00006 382/115 |
| 2009/0219154 A1 | 9/2009 | Kukula et al. | |
| 2009/0232367 A1* | 9/2009 | Shinzaki | G06K 9/0012 382/124 |
| 2010/0098302 A1* | 4/2010 | Shin | G06K 9/0012 382/124 |
| 2010/0266168 A1* | 10/2010 | Wang | G06K 9/001 382/124 |
| 2010/0303310 A1 | 12/2010 | Chiu | |
| 2011/0090047 A1 | 4/2011 | Patel | |
| 2012/0013724 A1* | 1/2012 | McNulty | G06K 9/0012 348/77 |
| 2014/0294262 A1* | 10/2014 | Schuckers | G06K 9/00114 382/125 |
| 2016/0034744 A1* | 2/2016 | Chiang | G06K 9/00073 382/125 |
| 2016/0070967 A1* | 3/2016 | Du | G06K 9/00093 382/124 |
| 2016/0350580 A1* | 12/2016 | Pyun | G06K 9/00073 |
| 2017/0344846 A1* | 11/2017 | Yoshida | A61B 5/117 |
| 2017/0372049 A1* | 12/2017 | Tieu | G06F 21/36 |

FOREIGN PATENT DOCUMENTS

| | | |
|---|---|---|
| CN | 1172308 A | 2/1998 |
| CN | 1877510 A | 12/2006 |
| CN | 103439030 A | 12/2013 |
| CN | 105068731 A | 11/2015 |
| CN | 105094443 A | 11/2015 |
| CN | 105117086 A | 12/2015 |
| EA | 199901109 A1 | 6/2000 |
| EP | 0372762 A2 | 6/1990 |
| EP | 0929028 A2 | 7/1999 |
| EP | 1162577 A2 | 12/2001 |
| EP | 2733636 A1 | 5/2014 |
| GB | 2451888 A | 2/2009 |
| JP | H 3-113679 A | 5/1991 |
| JP | H 6-28463 A | 2/1994 |
| JP | H 6-162176 A | 6/1994 |
| JP | H 8-129644 A | 5/1996 |
| JP | H 8-509562 A | 10/1996 |
| JP | H 11-96358 A | 4/1999 |
| JP | 2004-171551 A | 6/2004 |
| JP | 2004-259173 A | 9/2004 |
| WO | WO 95/30793 | 11/1955 |
| WO | WO 2009/024811 A1 | 2/2009 |
| WO | WO 2017/031841 A1 | 3/2017 |

OTHER PUBLICATIONS

English version of International Search Report of PCT/CN2016/101023, mailed from the State Intellectual Property Office of China dated Jan. 6, 2017.

International Search Report of PCT/CN2016/101023, mailed from the State Intellectual Property Office of China dated Jan. 6, 2017.

Zi-Qin Pan et al., "The influence of Pressure and Ink Amount on the Level-3 Features of Fingerprint", Chinese Journal of Forensic Sciences, 2015, No. 1, Total No. 78.

* cited by examiner

METHOD AND APPARATUS FOR DETECTING PRESSURE

CROSS-REFERENCE TO RELATED APPLICATIONS

The present application is based upon and claims priority to Chinese Patent Application No. 201610088291.3, filed Feb. 17, 2016, the entire contents of which are incorporated herein by reference.

TECHNICAL FIELD

The present disclosure generally relates to the field of terminal technology and, more particularly, to a method and an apparatus for detecting pressure.

BACKGROUND

Terminals, such as mobile phones and tablet computers, are electronic devices that are commonly used in people's daily life. Conventionally, to enable a terminal to detect pressure, a specialized pressure sensing module is provided in the terminal device to detect touch pressure applied on the pressure sensing module. Typically, the pressure sensing module may be a resistor-type sensor or a capacitor-type sensor. However, such specialized pressure sensing module adds extra volume and weight to the terminal and thus prevents the terminal from being made smaller, lighter, or cheaper.

SUMMARY

According to a first aspect of the present disclosure, there is provided a method for detecting pressure, comprising: acquiring, via a fingerprint recognition sensor, a plurality of successive fingerprint images; recognizing sweat pores in the plurality of successive fingerprint images; determining a feature of the recognized sweat pores in the plurality of successive fingerprint images; and determining a changing trend of pressure applied on the fingerprint recognition sensor over time based on a changing trend of the feature of the recognized sweat pores across the plurality of successive fingerprint images.

According to a second aspect of the present disclosure, there is provided an apparatus for detecting pressure, comprising: a processor; and a memory for storing instructions executable by the processor; wherein the processor is configured to perform: acquiring, via a fingerprint recognition sensor, a plurality of successive fingerprint images; recognizing sweat pores in the plurality of successive fingerprint images; determining a feature of the recognized sweat pores in the plurality of successive fingerprint images; and determining a changing trend of pressure applied on the fingerprint recognition sensor over time based on a changing trend of the feature of the recognized sweat pores across the plurality of successive fingerprint images.

According to a third aspect of the present disclosure, there is provided a non-transitory computer-readable storage medium storing instructions that, when executed by a processor, cause the processor to perform a method for detecting pressure, the method comprising: acquiring, via a fingerprint recognition sensor, a plurality of successive fingerprint images; recognizing sweat pores in the plurality of successive fingerprint images; determining a feature of the recognized sweat pores in the plurality of successive fingerprint images; and determining a changing trend of pressure applied on the fingerprint recognition sensor over time based on a changing trend of the feature of the recognized sweat pores across the plurality of successive fingerprint images.

It is to be understood that both the foregoing general description and the following detailed description are exemplary and explanatory only and are not restrictive of the present disclosure.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

A terminal, such as a mobile phone or a tablet computer, is usually equipped with a fingerprint recognition sensor. The fingerprint identifying sensor may be an optical fingerprint recognition sensor, a capacitive fingerprint recognition sensor, an ultrasonic fingerprint sensor, or any other type of fingerprint recognition sensor. The principle underlying the different types of fingerprint recognition sensor is similar, i.e., to obtain a fingerprint image by scanning rugged print lines on a surface of a finger.

Figure 1:
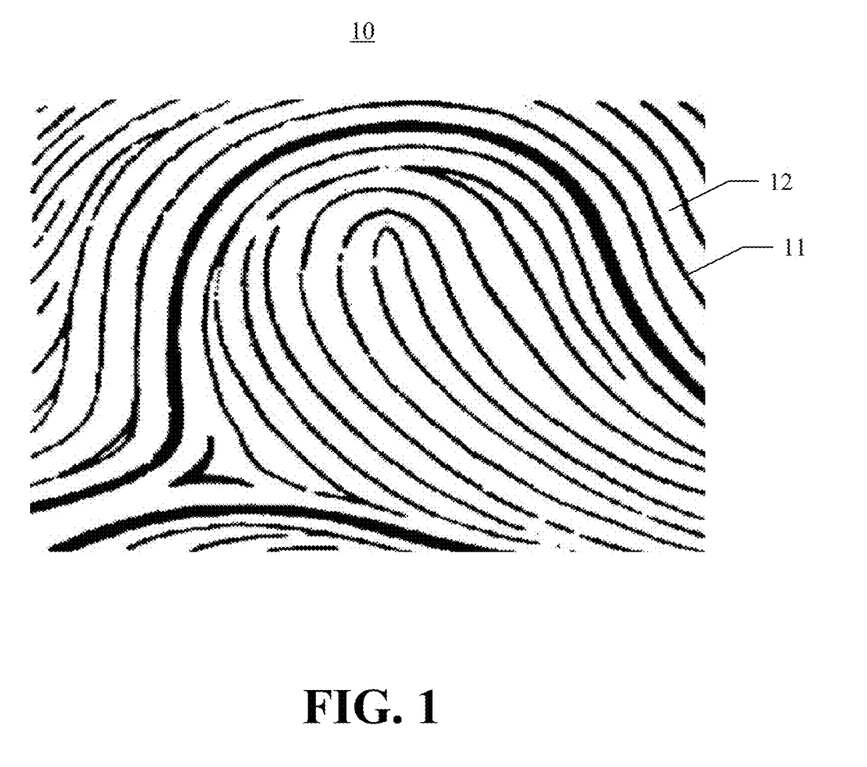
FIG. 1 is a schematic diagram illustrating an exemplary fingerprint image.

FIG. 1 is a schematic diagram illustrating an exemplary fingerprint image 10. As shown in FIG. 1, the fingerprint image 10 shows fingerprint ridgelines 11 (represented by the black lines in FIG. 1) and fingerprint valley lines 12 (represented by the white regions between the black lines in FIG. 1) of a fingerprint. The fingerprint image 10 can be used to perform fingerprint matching. For example, feature points of the fingerprint are recognized from the fingerprint image 10. Feature points of different fingerprint images are then compared to obtain a fingerprint matching result. The feature points of the fingerprint include but are not limited to end points, branch points, joint points, and break points of the ridgelines.

The term "fingerprint" used herein generally refers to, but is not limited to, print lines of a finger or other body parts (e.g., a palm) of a user.

The present disclosure provides a method and apparatus for detecting touch pressure according to fingerprint images acquired by the fingerprint recognition sensor. The disclosed method and apparatus will be introduced and illustrated with reference to the exemplary embodiments below.

Figure 2:
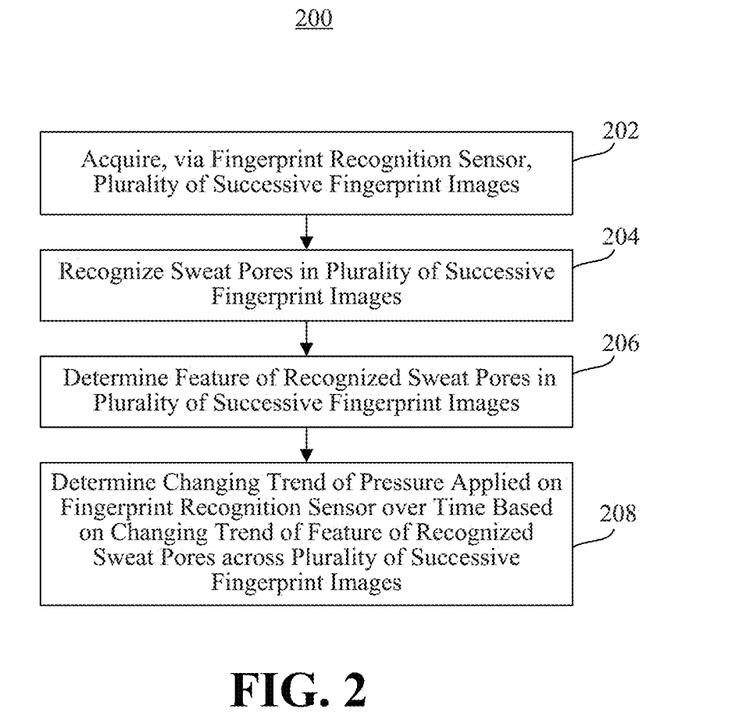
FIG. 2 is a flowchart of a method for detecting pressure, according to an exemplary embodiment.

FIG. 2 is a flowchart of a method 200 for detecting pressure, according to an exemplary embodiment. In some disclosed embodiments, the method 200 is performed by a terminal equipped with a fingerprint recognition sensor. For example, the terminal may be a mobile phone, a tablet computer, a wearable device, or the like. Referring to FIG. 2, the method 200 includes the following steps 202-208.

At step 202, the terminal acquires, via a fingerprint recognition sensor, a plurality of successive fingerprint images.

At step 204, the terminal recognizes sweat pores in the plurality of successive fingerprint images.

At step 206, the terminal determines a feature of the recognized sweat pores in the plurality of successive fingerprint images.

At step 208, the terminal determines a changing trend of pressure applied on the fingerprint recognition sensor over time based on a changing trend of the feature of the recognized sweat pores across the plurality of successive fingerprint images.

The method 200 can solve the problem that a terminal needs to detect pressure via a specialized pressure sensing module, which prevents the terminal from being made smaller, lighter, or cheaper. Since the method 200 eliminates the need for providing the pressure sensing module in the terminal, the method 200 can make the terminal smaller, lighter, and cheaper.

Figure 3:
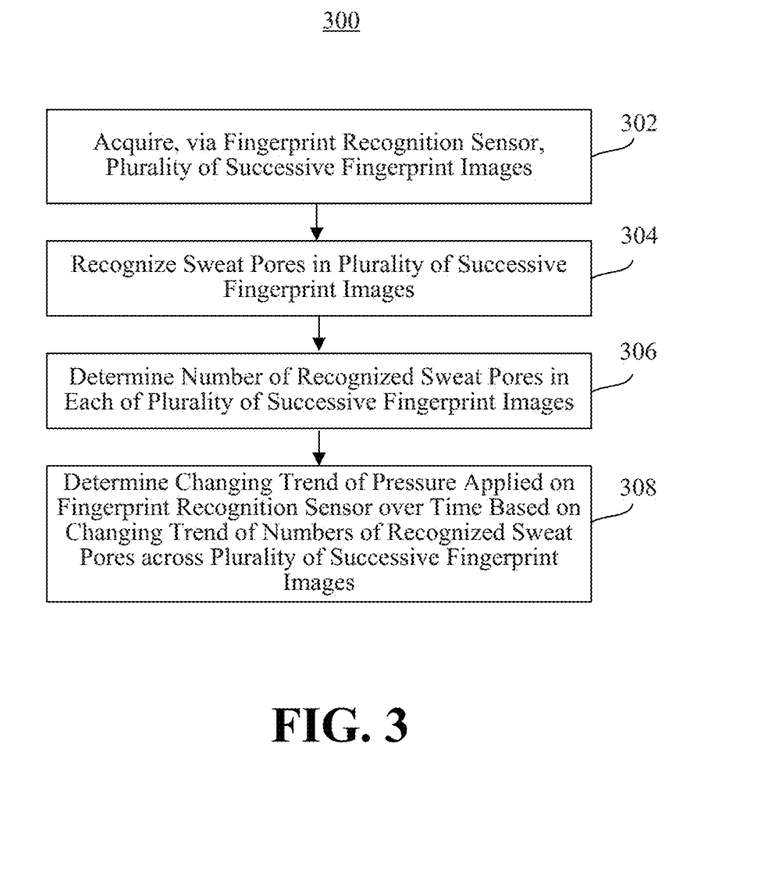
FIG. 3 is a flowchart of a method for detecting pressure, according to an exemplary embodiment.

FIG. 3 is a flowchart of a method 300 for detecting pressure, according to an exemplary embodiment. In some disclosed embodiments, the method 300 is performed by a terminal equipped with a fingerprint recognition sensor. For example, the terminal may be a mobile phone, a tablet computer, a wearable device, or the like. Referring to FIG. 3, the method 300 includes the following steps 302-308.

At step 302, the terminal acquires, via a fingerprint recognition sensor, a plurality of successive fingerprint images.

Specifically, a body part, such as a finger, of the user of the terminal includes numerous sweat pores randomly distributed on the skin surface of the body part. A sweat pore is an opening of a sweat gland on the skin surface. Consistent with the disclosed embodiments, a fingerprint image includes information representative of the sweat pores and print lines on the skin surface.

At step 304, the terminal recognizes sweat pores in the plurality of successive fingerprint images.

In the disclosed embodiments, the terminal recognizes the sweat pores present in each of the plurality of successive fingerprint images. The fingerprint images may be presented as grayscale images. The grayscale value is in inverse correlation with a distance between the skin surface and the fingerprint recognition sensor. That is, the higher a grayscale level of a pixel in the fingerprint image, the shorter the distance between the skin surface corresponding to the pixel and the fingerprint recognition sensor. Conversely, the lower a grayscale level of a pixel in the fingerprint image, the longer the distance between the skin surface corresponding to the pixel and the fingerprint recognition sensor. A sweat pore is shown as a dot with a certain grayscale level in the fingerprint image. In one embodiment, for each of the plurality of successive fingerprint images, the terminal recognizes an image element as a sweat pore when the terminal determines a pixel feature of the image element satisfies a preset condition. Here, the preset condition may include the grayscale level of the image element being higher than a preset grayscale value and the size of the image element being smaller than a preset size.

At step 306, the terminal determines a number of the recognized sweat pores in each of the plurality of successive fingerprint images.

In the disclosed embodiments, the changing trend of the touch pressure on the fingerprint recognition sensor may be detected according to the changing trend of the numbers of the recognized sweat pores across the plurality of successive fingerprint images. When the touch pressure increases, the concave parts (i.e., the valley lines) of the skin surface gradually approach the fingerprint recognition sensor. As such, the sweat pores at the concave parts can be detected by the fingerprint recognition sensor and recorded in the fingerprint images. Therefore, with the touch pressure increasing, the numbers of the recorded sweat pores gradually increase across the plurality of successive fingerprint images. Conversely, with the touch pressure decreasing, the numbers of the recorded sweat pores gradually decrease across the plurality of successive fingerprint images.

In some embodiments, the terminal determines the numbers of the sweat pores at central regions of the fingerprint images, since the image signals acquired by the fingerprint recognition sensor generally have better qualities at the central regions than at the periphery regions. As such, by counting the numbers of the sweat pores in the central regions of the fingerprint images, the accuracy of the counting result can be improved. In the disclosed embodiments, the size and the shape of the central regions are not limited and may be set in advance depending on practical requirements.

At step 308, the terminal determines a changing trend of pressure applied on the fingerprint recognition sensor over time based on a changing trend of the numbers of the recognized sweat pores across the plurality of successive fingerprint images.

Specifically, when the numbers of the recognized sweat pores gradually increase across the plurality of successive fingerprint images, the terminal concludes that the pressure applied on the fingerprint recognition sensor gradually increases over time. Conversely, when the numbers of the recognized sweat pores gradually decrease across the plurality of successive fingerprint images, the terminal concludes that the pressure applied on the fingerprint recognition sensor gradually decreases over time.

Consistent with the disclosed embodiments, the terminal may perform various operations according to the changing trend of the pressure. For example, the terminal may adjust the volume of sound or brightness of a screen according to the changing trend of the pressure. In one embodiment, when the pressure is detected to increase gradually, the terminal also gradually increases the volume of the sound. Conversely, when the pressure is detected to decrease gradually, the terminal also gradually decreases the volume of the sound.

The method 300 can solve the problem that a terminal needs to detect pressure via a specialized pressure sensing module, which prevents the terminal from being made smaller, lighter, or cheaper. Since the method 300 eliminates the need for providing the pressure sensing module in the terminal, the method 300 can make the terminal smaller, lighter, and cheaper.

In addition, according to the method 300, the terminal determines the numbers of sweat pores in a plurality of successive fingerprint images, and determines the changing trend of the pressure applied on the fingerprint recognition sensor over time based on the changing trend of the numbers of the sweat pores across the plurality of successive fingerprint images. This way, the terminal can detect the change in the magnitude of the touch pressure based on the change in the numbers of the recognized sweat pores across the plurality of successive fingerprint images.

Figure 4:
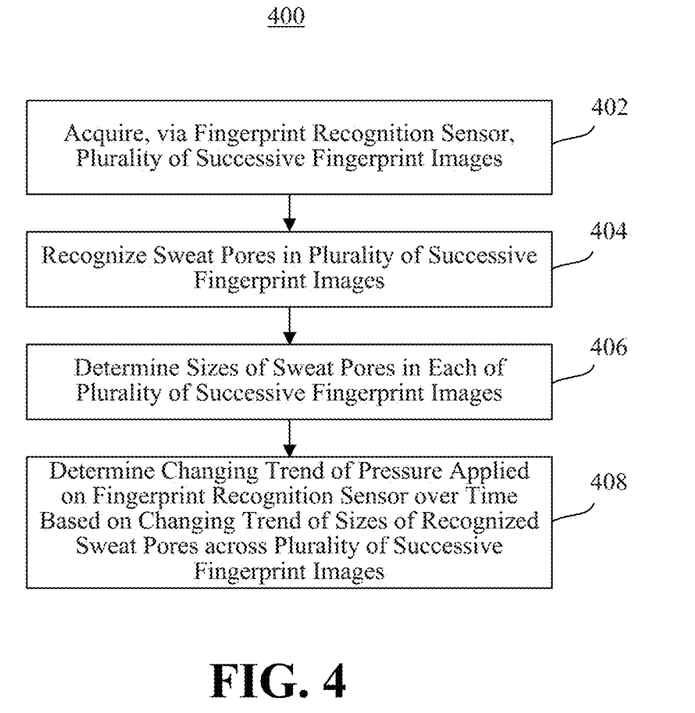
FIG. 4 is a flowchart of a method for detecting pressure, according to an exemplary embodiment.

FIG. 4 is a flowchart of a method 400 for detecting pressure, according to an exemplary embodiment. In some disclosed embodiments, the method 400 is performed by a terminal equipped with a fingerprint recognition sensor. For example, the terminal may be a mobile phone, a tablet computer, a wearable device, or the like. Referring to FIG. 4, the method 400 includes the following steps 402-408.

At step 402, the terminal acquires, via a fingerprint recognition sensor, a plurality of successive fingerprint images.

At step 404, the terminal recognizes sweat pores in the plurality of successive fingerprint images.

The above steps 402 and 404 are similar to the steps 302 and 304, respectively. As such, the details of steps 402 and 404 may be referred to the above description of the steps 302 and 304, which will not be repeated herein.

At step 406, the terminal determines sizes of the recognized sweat pores in each of the plurality of successive fingerprint images.

The sizes of the sweat pores refer to areas occupied by the sweat pores on the fingerprint images. The terminal can detect the changing trend of the touch pressure based on the changing trend of the sizes of the sweat pores across the plurality of successive fingerprint images. For example, when a finger touches the fingerprint recognition sensor and applies pressure, the sweat pores of the finger form contact with the fingerprint recognition sensor. With the touch pressure increasing, the sizes of the sweat pores recorded in the fingerprint images gradually increase across the plurality of successive fingerprint images. Conversely, with the touch pressure decreasing, the sizes of the sweat pores recorded in the fingerprint images gradually decrease across the plurality of successive fingerprint images. Moreover, when under pressure, the sweat pores release sweat. On the fingerprint images, the sweat is represented by white dots at the central regions of the sweat pores. Therefore, in some embodiments, in addition to replying on the sizes of the sweat pores, the terminal also determines the changing trend of the pressure applied on the fingerprint recognition sensor over time based on whether sweat is released from the sweat pores and/or the amount of the released sweat.

In some embodiments, the terminal selects at least one target sweat pore and determines the sizes of the target sweat pore in the plurality of successive fingerprint images. The target sweat pore may be a sweat pore shown with high definition in the fingerprint images. This way, the terminal can detect the changing trend of the sizes of the target sweat pore with high accuracy.

At step 408, the terminal determines a changing trend of pressure applied on the fingerprint recognition sensor over time based on a changing trend of the sizes of the recognized sweat pores across the plurality of successive fingerprint images.

As described above, when the sizes of the sweat pores gradually increase across the plurality of successive fingerprint images, the terminal concludes that the pressure applied on the fingerprint recognition sensor gradually increases over time. Conversely, when the sizes of the sweat pores gradually decrease across the plurality of successive fingerprint images, the terminal concludes that the pressure applied on the fingerprint recognition sensor gradually decreases over time.

The method 400 solves the problem that a terminal needs to detect pressure via a specialized pressure sensing module, which prevents the terminal from being made smaller, lighter, or cheaper. Since the method 400 eliminates the need for providing the pressure sensing module in the terminal, the method 400 can make the terminal smaller, lighter, and cheaper.

In addition, according to the method 400, the sizes of the sweat pores in the fingerprint images are determined, and the changing trend of the pressure applied on the fingerprint recognition sensor over time is determined based on the changing trend of the sizes of the sweat pores across the plurality of successive fingerprint images. This way, the terminal can detect the change in the magnitude of the touch pressure based on the change in the sizes of the recognized sweat pores across the plurality of successive fingerprint images.

The methods 300 and 400 provide two different ways for detecting pressure based on a feature of the sweat pores. The method 300 is based on the change in the numbers of the recognized sweat pores over time (i.e., across a plurality of successive fingerprint images), and the method 400 is based on the change in the sizes of the sweat pores over time. In practice, the terminal may detect the pressure using the method 300, the method 400, or a combination of the method 300 and method 400.

In some embodiments, after determining a feature of the sweat pores, the terminal further determines a pressure level corresponding to the determined feature of the sweat pores, based on a predetermined corresponding relationship between values indicative of the feature and the corresponding pressure levels. For example, the feature of the sweat pores may be the number of the sweat pores. After determining the number of the sweat pores in a fingerprint image, the terminal queries the predetermined corresponding relationship to determine the pressure level corresponding to the determined number of the sweat pores. This way, the terminal can quantify the detected pressure and evaluate the magnitude of the detected pressure. In practice, the predetermined corresponding relationship may be established based on experimental data or set by the user. The predetermined corresponding relationship is pre-stored in the terminal.

Next, the apparatus embodiments of the present disclosure will be described. The disclosed apparatus embodiments are configured to perform the above-described methods for detecting pressure. Details that are not described in connection with the apparatus embodiments below can be understood by referring to the relevant description in the above method embodiments.

Figure 5:
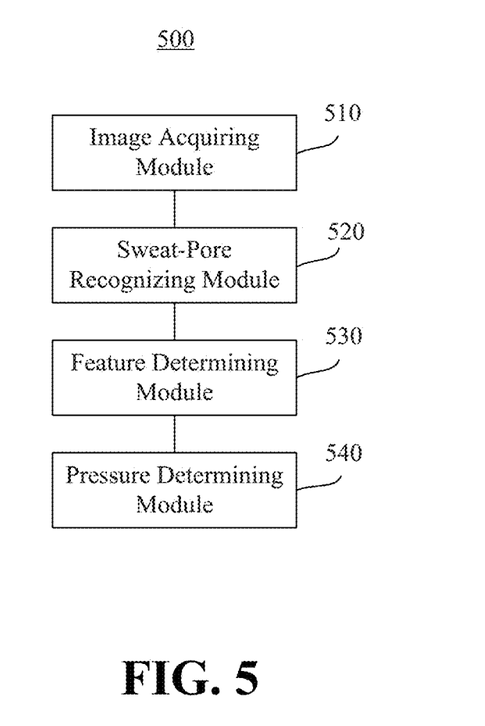
FIG. 5 is a block diagram of an apparatus for detecting pressure, according to an exemplary embodiment.

FIG. 5 is a block diagram of an apparatus 500 for detecting pressure, according to an exemplary embodiment. In the disclosed embodiments, the apparatus 500 may be implemented by software, hardware, or a combination of both software and hardware, to form a part or the whole of a terminal. Referring to FIG. 5, the apparatus 500 includes: an image acquiring module 510, a sweat-pore recognizing module 520, a feature determining module 530, and a pressure determining module 540.

The image acquiring module 510 is configured to acquire a plurality of successive fingerprint images via a fingerprint recognition sensor.

The sweat-pore recognizing module 520 is configured to recognize sweat pores in the plurality of successive fingerprint images.

The feature determining module 530 is configured to determine a feature of the recognized sweat pores in the plurality of successive fingerprint images.

The pressure determining module 540 is configured to determine a changing trend of pressure applied on the fingerprint recognition sensor over time based on a changing trend of the feature of the recognized sweat pores across the plurality of successive fingerprint images.

The apparatus 500 solves the problem that a terminal needs to detect pressure via a specialized pressure sensing module, which prevents the terminal from being made smaller, lighter, or cheaper. Since the apparatus 500 eliminates the need for providing the pressure sensing module in the terminal, the apparatus 500 can make the terminal smaller, lighter, and cheaper.

In some embodiments, the feature of the recognized sweat pores includes numbers of the recognized sweat pores in the plurality of successive fingerprint images. Accordingly, the feature determining module 530 is further configured to determine the numbers of the sweat pores in central regions of the plurality of successive fingerprint images. Moreover, the pressure determining module 540 is further configured to: when the numbers of the recognized sweat pores increase across the plurality of successive fingerprint images, conclude that the pressure applied on the fingerprint recognition sensor increases over time; and when the numbers of the recognized sweat pores decrease across the plurality of successive fingerprint images, conclude that the pressure applied on the fingerprint recognition sensor decreases over time.

In some embodiments, the feature of the recognized sweat pores includes sizes of the recognized sweat pores in the plurality of successive fingerprint images. Accordingly, the feature determining module 530 is further configured to select at least one target sweat pore and determine sizes of the target sweat pore in the plurality of successive fingerprint images. Moreover, the pressure determining module 540 is configured to: when the sizes of the target sweat pore increase across the plurality of successive fingerprint images, conclude that the pressure applied on the fingerprint recognition sensor increases over time; and when the sizes of the target sweat pore decrease across the plurality of successive fingerprint images, conclude that the pressure applied on the fingerprint recognition sensor decreases over time.

In some embodiments, the sweat-pore recognizing module 520 is further configured to recognize an image element in a fingerprint image as a sweat pore when a pixel feature of the image element satisfies a preset condition. Here, the preset condition includes a grayscale level of the image element being higher than a preset grayscale value and a size of the image element being smaller than a preset size.

One of ordinary skill in the art will understand that the above-described modules can each be implemented by hardware, or software, or a combination of hardware and software. One of ordinary skill in the art will also understand that multiple ones of the above described modules may be combined as one module, and each of the above described modules may be further divided into a plurality of sub-modules.

Moreover, the specific manners of above-described modules in performing their operations have been described in detail in the method embodiments, which will not be repeated herein.

Figure 6:
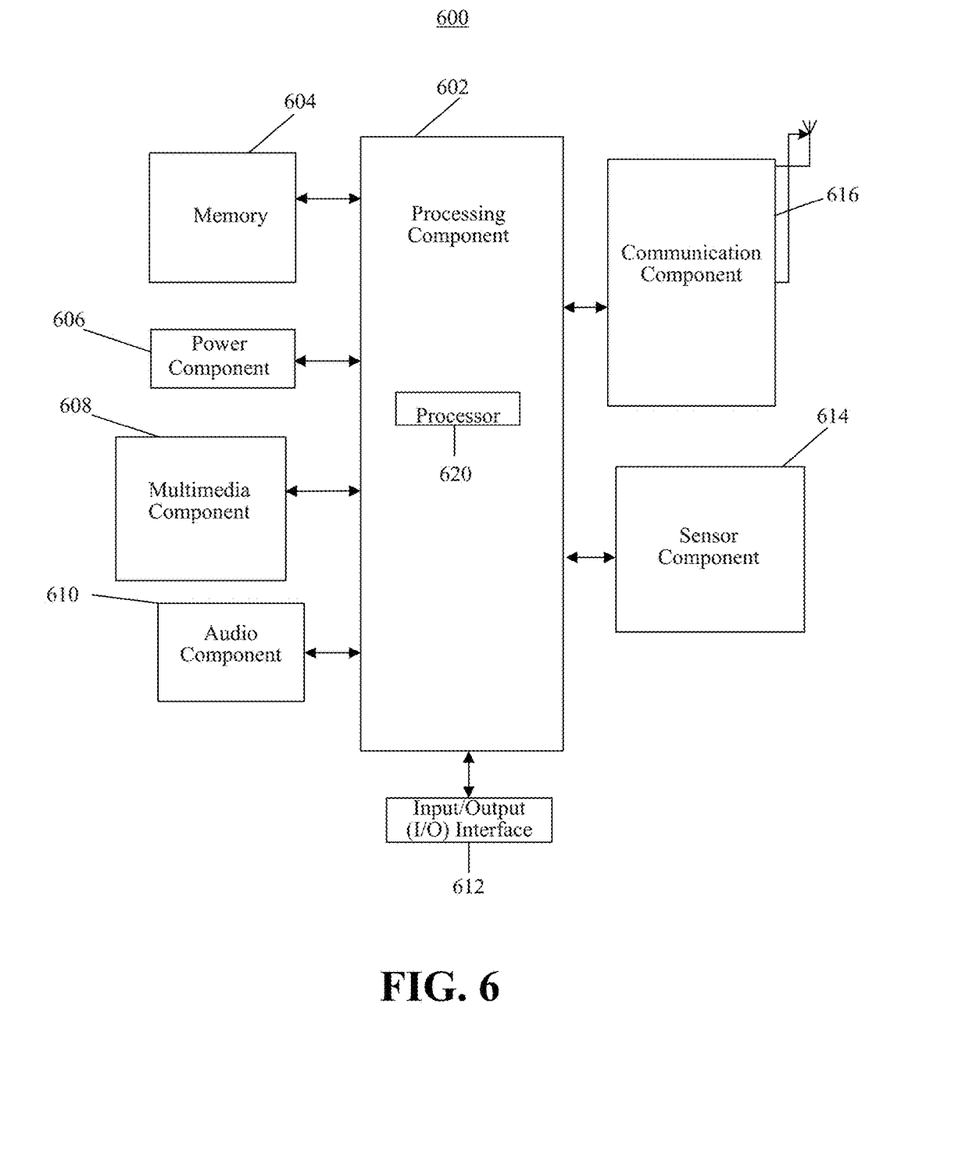
FIG. 6 is a block diagram of an apparatus for detecting pressure, according to an exemplary embodiment.

FIG. 6 is a block diagram of an apparatus 600 for detecting pressure, according to an exemplary embodiment. For example, the apparatus 600 may be a mobile phone, a computer, a digital broadcast terminal, a messaging device, a gaming console, a tablet, a medical device, exercise equipment, a personal digital assistant, and the like. In the disclosed embodiments, apparatus 600 may be configured to perform the above-described methods for detecting pressure.

Referring to FIG. 6, the apparatus 600 includes one or more of the following components: a processing component 602, a memory 604, a power component 606, a multimedia component 608, an audio component 610, an input/output (I/O) interface 612, a sensor component 614, and a communication component 616.

The processing component 602 typically controls overall operations of the apparatus 600, such as the operations associated with display, telephone calls, data communications, camera operations, and recording operations. The processing component 602 includes one or more processors 620 to execute instructions to perform all or some of the steps in the above described methods. Moreover, the processing component 602 includes one or more modules which facilitate the interaction between the processing component 602 and other components. For instance, the processing component 602 may include a multimedia module to facilitate the interaction between the multimedia component 608 and the processing component 602.

The memory 604 is configured to store various types of data to support the operation of the apparatus 600. Examples of such data include instructions for any applications or methods operated on the apparatus 600, contact data, phonebook data, messages, pictures, video, etc. The memory 604 can be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 606 provides power to various components of the apparatus 600. The power component 606 includes a power management system, one or more power sources, and any other components associated with the generation, management, and distribution of power in the apparatus 600.

The multimedia component 608 includes a screen providing an output interface between the apparatus 600 and the user. In some embodiments, the screen includes a liquid crystal display (LCD) and/or a touch panel. If the screen includes the touch panel, the screen can be implemented as a touch screen to receive input signals from the user. The touch panel includes one or more touch sensors to sense touches, swipes, and gestures on the touch panel. In some embodiments, the touch sensors not only senses a boundary of a touch or swipe action, but also senses a period of time and a pressure associated with the touch or swipe action. In some embodiments, the multimedia component 608 includes a front camera and/or a rear camera. The front camera and/or the rear camera receive an external multimedia data while the apparatus 600 is in an operation mode, such as a photographing mode or a video mode. Each of the front camera and the rear camera can be a fixed optical lens system or have focus and optical zoom capability.

The audio component 610 is configured to output and/or input audio signals. For example, the audio component 610 includes a microphone configured to receive an external audio signal when the apparatus 600 is in an operation mode, such as a call mode, a recording mode, and a voice recognition mode. The received audio signal can be further stored in the memory 604 or transmitted via the communication component 616. In some embodiments, the audio component 610 further includes a speaker to output audio signals.

The I/O interface 612 provides an interface between the processing component 602 and peripheral interface modules, such as a keyboard, a click wheel, buttons, and the like. The buttons include, but are not limited to, a home button, a volume button, a starting button, and a locking button.

The sensor component 614 includes one or more sensors to provide status assessments of various aspects of the apparatus 600. The sensor component 614 includes at least one fingerprint recognition sensor, such as an optical fingerprint recognition sensor, a capacitive fingerprint recognition sensor, an ultrasonic fingerprint sensor, or other types of fingerprint recognition sensor. Optionally, the sensor component 614 can detect an open/closed status of the apparatus 600, relative positioning of components, e.g., the display and the keypad, of the apparatus 600, a change in position of the apparatus 600 or a component of the apparatus 600, a presence or absence of user contact with the apparatus 600, an orientation or an acceleration/deceleration of the apparatus 600, and a change in temperature of the apparatus 600. The sensor component 614 includes a proximity sensor configured to detect the presence of nearby objects without any physical contact. In some embodiments, the sensor component 614 also includes a light sensor, such as a complementary metal oxide semiconductor (CMOS) or a charge coupled device (CCD) image sensor, for use in imaging applications. In some embodiments, the sensor component 614 also includes an accelerometer sensor, a gyroscope sensor, a magnetic sensor, a pressure sensor, or a temperature sensor.

The communication component 616 is configured to facilitate communication, wired or wirelessly, between the apparatus 600 and other devices. The apparatus 600 can access a wireless network based on a communication standard, such as WiFi, 2G, 3G, 4G, 5G, or a combination thereof. In one exemplary embodiment, the communication component 616 receives a broadcast signal or broadcast associated information from an external broadcast management system via a broadcast channel In one exemplary embodiment, the communication component 616 further includes a near field communication (NFC) module to facilitate short-range communications. For example, the NFC module can be implemented based on a radio frequency identification (RFID) technology, an infrared data association (IrDA) technology, an ultra-wideband (UWB) technology, a Bluetooth (BT) technology, and other technologies.

In exemplary embodiments, the apparatus 600 can be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 604, executed by the processor 620 to perform the above-described methods. For example, the non-transitory computer-readable storage medium can be a ROM, a random access memory (RAM), a CD-ROM, a magnetic tape, a floppy disc, an optical data storage device, and the like.

It should be understood that, the term "a plurality of" used herein refers to two or more than two. The term "and/or" is used to cover three types of correlations between associated objects. For example, the three correlations described the phrase "A and/or B" are: only A exists; both A and B exist; and only B exists. The symbol "I" placed between two words generally means that there is an "or" relationship between the two words.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for detecting pressure, comprising:
    acquiring, via a fingerprint recognition sensor, a plurality of successive fingerprint images;
    recognizing sweat pores in the plurality of successive fingerprint images;
    determining a feature of the recognized sweat pores in the plurality of successive fingerprint images; and
    determining a changing trend of pressure applied on the fingerprint recognition sensor over time based on a changing trend of the feature of the recognized sweat pores across the plurality of successive fingerprint images;
    wherein:
    the feature of the recognized sweat pores includes numbers of the recognized sweat pores in the plurality of successive fingerprint images; and
    determining the changing trend of the pressure applied on the fingerprint recognition sensor over time based on the changing trend of the feature of the recognized sweat pores across the plurality of successive fingerprint images includes:
        when the numbers of the recognized sweat pores increase across the plurality of fingerprint images, determining that the pressure applied on the fingerprint recognition sensor increases over time; and
        when the numbers of the recognized sweat pores decrease across the plurality of successive fingerprint images, determining that the pressure applied on the fingerprint recognition sensor decreases over time.

2. The method of claim 1, wherein determining the feature of the recognized sweat pores in the plurality of successive fingerprint images includes:
    determining the numbers of the recognized sweat pores in the plurality of successive fingerprint images.

3. The method of claim 1, wherein recognizing the sweat pores in the plurality of successive fingerprint images includes:

recognizing an image element of a fingerprint image as a sweat pore when a pixel feature of the image element satisfies a preset condition, the preset condition including:
a grayscale level of the image element is higher than a preset grayscale value and a size of the image element is smaller than a preset size.

4. An apparatus for detecting pressure, comprising:
a processor; and
a memory for storing instructions executable by the processor;
wherein the processor is configured to perform:
acquiring, via a fingerprint recognition sensor, a plurality of successive fingerprint images;
recognizing sweat pores in the plurality of successive fingerprint images;
determining a feature of the recognized sweat pores in the plurality of successive fingerprint images; and
determining a changing trend of pressure applied on the fingerprint recognition sensor over time based on a changing trend of the feature of the recognized sweat pores across the plurality of successive fingerprint images,
wherein:
the feature of the recognized sweat pores includes numbers of the recognized sweat pores in the plurality of successive fingerprint images; and
the processor is further configured to perform:
when the numbers of the recognized sweat pores increase across the plurality of fingerprint images, determining that the pressure applied on the fingerprint recognition sensor increases over time; and
when the numbers of the recognized sweat pores decrease across the plurality of successive fingerprint images, determining that the pressure applied on the fingerprint recognition sensor decreases over time.

5. The apparatus of claim 4, wherein the processor is further configured to perform:
determining the numbers of the recognized sweat pores in the plurality of successive fingerprint images.

6. The apparatus of claim 4, wherein the processor is further configured to perform:
recognizing an image element of a fingerprint image as a sweat pore when a pixel feature of the image element satisfies a preset condition, the preset condition including:
a grayscale level of the image element is higher than a preset grayscale value and a size of the image element is smaller than a preset size.

7. A non-transitory computer-readable storage medium storing instructions that, when executed by a processor, cause the processor to perform a method for detecting pressure, the method comprising:
acquiring, via a fingerprint recognition sensor, a plurality of successive fingerprint images;
recognizing sweat pores in the plurality of successive fingerprint images;
determining a feature of the recognized sweat pores in the plurality of successive fingerprint images; and
determining a changing trend of pressure applied on the fingerprint recognition sensor over time based on a changing trend of the feature of the recognized sweat pores across the plurality of successive fingerprint images,
wherein:
the feature of the recognized sweat pores includes numbers of the recognized sweat pores in the plurality of successive fingerprint images; and
determining the changing trend of the pressure applied on the fingerprint recognition sensor over time based on the changing trend of the feature of the recognized sweat pores across the plurality of successive fingerprint images includes:
when the numbers of the recognized sweat pores increase across the plurality of fingerprint images, determining that the pressure applied on the fingerprint recognition sensor increases over time; and
when the numbers of the recognized sweat pores decrease across the plurality of successive fingerprint images, determining that the pressure applied on the fingerprint recognition sensor decreases over time.

* * * * *